United States Patent

[11] 3,589,736

[72] Inventor Harry Gorman
 2717 Holland Ave., New York, N.Y. 10467
[21] Appl. No. 657,819
[22] Filed Aug. 2, 1967
[45] Patented June 29, 1971

[54] SOUND-REPRODUCING CONTAINER COVERS
 1 Claim, 5 Drawing Figs.
[52] U.S. Cl. .................................................. 274/42, 220/60
[51] Int. Cl. .................................................. B41b 1/20
[50] Field of Search .................................... 274/42, 42 P; 220/60, 42 A; 206/47, 62 PR

[56] References Cited
 UNITED STATES PATENTS
 3,000,640 9/1961 Strauss .................. 274/42
 2,020,381 11/1935 Labowitz et al. .......... 206/46

Primary Examiner—Leonard Forman
Assistant Examiner—Dennis A. Dearing
Attorney—Homer J. Bridger ABSTRACT: A synthetic resin container cover, e.g. for coffee cans once the sealed cover end is removed, which has a disc formed with a sound-reproducing groove of a phonograph record, an apron or flange unitary with the disc and extending all around the latter for engagement with the can, and a weakened portion or bead enabling separation of the integral disc from the flange when the recording is to be played.

PATENTED JUN 29 1971 3,589,736
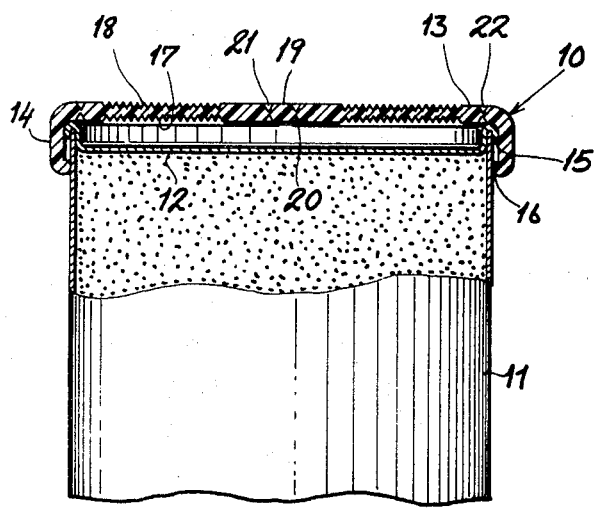
Fig.1
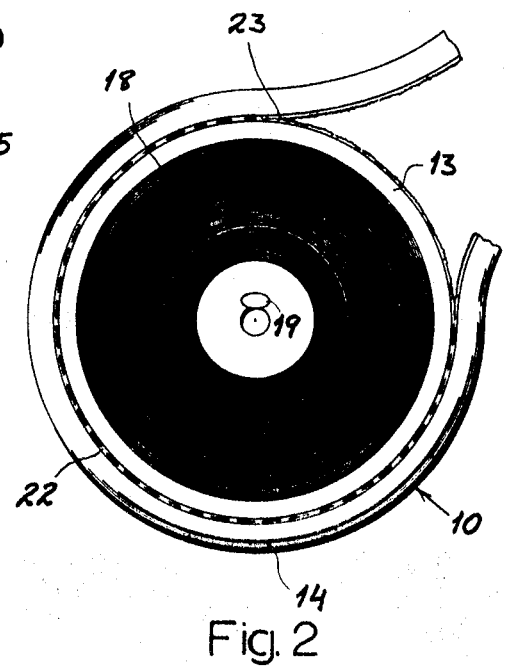
Fig. 2
Fig.4
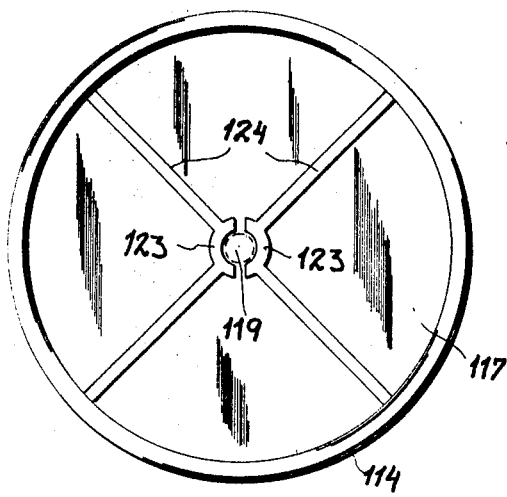
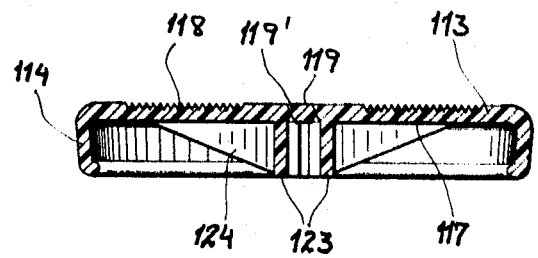
Fig. 3
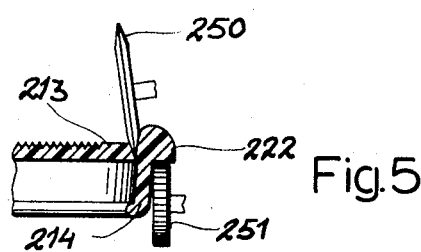
Fig.5
Harry Gorman
INVENTOR.
BY Homer J Bridger

SOUND-REPRODUCING CONTAINER COVERS

This application is a continuation-in-part of Ser. No. 543,630, filed 19 Apr. 1966, now U.S. Pat. No. 3,367,665.

My present invention relates to container covers of a synthetic resin material of the type adapted to serve as closures for metal, glass or plastic receptacles.

The use of receptacles with removable and replaceable covers serving as hermetic seals and composed of a synthetic resin material has become increasingly more common, especially where screw-type closures are to be avoided and the cover is to provide a tight seal against introduction of air, moisture and contaminants and against loss of the contents of the container. Thus, for example, coffee cans can be provided with the usual canning-type endpiece one of which can be cut away by the user to open the receptacle and the freshness of its contents is thereafter maintained by a circular plastic cover whose downwardly extending flange hugs the remainder of the can. In this manner, a better seal is obtainable than was possible with the use of metal coffee can covers. Similar covers are employed as closures for plastic containers used in the marketing of many types of consumables including ice cream, fruit, etc.

I have now found that such cover members which have an inner face and an outer face of substantially planar character, can be provided with a spiral sound-reproducing record groove during the molding of the cover so that such covers can be employed for promotional purposes in connection with the product on which they are used, for conveying information dependent on the product, for providing musical entertainment or the like. According to one feature of this invention, the record groove is impressed directly in the synthetic resin (usually thermoplastic material of the cover along its inner surface so as to be framed by the annular sealing flange which is connected with the broad surfaces of the cover by a weakened junction such that this flange can be readily removed and the resulting record disc placed upon a conventional turntable. In all cases, means are provided centrally of the disc for receiving the spindle of the record player. Such means may include a weakened zone through which the spindle can be forced or a removable piece which can be readily extracted by the user. Both the flange and this central region of the disc are, of course, usually integral with the remainder of the disc and constitute a tight seal for the container with which they are used. Moreover, the flange portion may be provided with means engageable with the cooperating parts of a conventional can opener to sever the flange from the disc portion or so weaken the junction as to permit the flange to be stripped from the disc.

I have found that the present invention can be employed without limiting previous techniques of applying informational matter such as identification of the goods or its maker, to the cover when the record groove is impressed upon one surface of the disc and the informational material is imposed upon the opposite face and the disc is made transparent at least to the extent that the imposed information is visible when the record groove is provided on the outer face of the disc. It will be understood, however, that both disc faces can be provided with such record grooves.

According to a further feature of this invention, the disc portion of the cover is provided on its outer face with the record groove surrounding the central zone of the disc which is adapted to receive the spindle and the annular sealing flange extending from the other face of the disc is permanently connected thereto so that, when the cover is disposed upon a phonograph turntable, the flange rests thereon. To prevent bowing of the record surface, I have provided around the central opening and preferably in the region thereof at least one formation extending from this other surface of the disc in the direction of the annular flange to serve as additional support for the central zones upon the turntable. In most cases, such formations, which can be equispaced about the spindle opening or symmetrically disposed with respect thereto, will suffice to prevent bowing of the record surface. When further stiffening of the latter is required, however, reinforcing ribs or the like can be molded integrally with the cover along the underside of the disc and preferably extending from the centrally disposed formations to the annular flange along the rib. Since such cover members are frequently mounted upon the containers with which they are to be used at a closed end of the latter for marketing purposes, the central portions may bear against such closed ends and cause the record surface to bow slightly outwardly. This has not, however, been found to cause any difficulties and can be eliminated by the use of ribs of a height equal to that of the supporting formations in the central zone. In connection with this aspect of the invention, it may be noted that the central formations can form a sleeve dimensioned to hug the spindle and thus increase the frictional engagement of the record with the turntable. While synthetic resin covers of substantially any conventional type can be used for the purposes of the present invention, it has been found that best results are obtained with thermoplastics such as acetates polyvinyls, polyethylene, and other polyolefins, polystyrene and the like.

The above and other objects, features and advantages of the present invention will become more readily apparent from the following description, reference being made to the accompanying drawing in which:

FIG. 1 is a transverse cross-sectional view through a cover in accordance with the present invention in place upon an unopened container;

FIG. 2 is a plan view of the cover illustrating the removal of the central zone for accommodating the spindle and the flange;

FIG. 3 is a cross-sectional view through another cover according to the invention;

FIG. 4 is a bottom view of this cover; and

FIG. 5 is a fragmentary cross-sectional view of another cover.

In the drawing, I show a thermoplastic cover 10 in place on the upper portion of a metal container 11 of the type used for ground coffee and the like. It will be understood, however, that similar covers can be employed with plastic, glass and other metallic receptacles for many purposes. Such coffee cans are commonly closed at both ends and thus have an end piece 12 at their upper end over which the cover 10 is forced. The cover 10 comprises a disc portion 13 overlying the end piece 12 and surrounded by an annular flange 14 dimensioned to hug the lip 15 at the upper end of the container 11 so that, upon removal of the end piece 12, a hermetic seal is formed at 16 between the flange 14 and the lip 15 of the can. The cover is thus used as long as the container, serves some useful function and, upon disposal of the container, can be employed for sound-reproducing purposes. The disc portion 13 of the cover 10 can be provided on its underside with a spiral recording groove 17 of the type conventionally impressed in laminated or nonlaminated records, this groove being protected from scuffing or distortion by the normal handling or stacking of the can. A similar recording groove 18, representing a continuation of a message of the underside, a separate piece of information, a musical selection in continuation of or different from that on the underside, or some other audible material can be provided on the upper surface. To permit the disc 13 to be disposed upon a record turntable, the central zone 19 is weakened by, for example, indentations 20 and 21 around this central zone which is dimensioned to pass the spindle of a turntable. Thus, the disc 13 can be placed upon a turntable and thrust downwardly so that the spindle pushes out the central disc 19 as indicated in FIG. 2 without difficulty. It is also possible, according to this invention, to provide the central pushout with a flap or other means for removing it manually before the disc is placed upon the turntable. When a record surface 17 is provided on the underside of the disc portion 13 of the cover 10, I prefer to remove the flange 14 to permit the stylus of the phonograph to engage the grooves 17 without difficulty. To this end, a weakened portion 22 is provided between the disc 13 and the flange 14 so that the flange can be torn away readily as shown at 23 in FIG. 2 so that only the flat disc remains to carry the recording. The disc, of course, can then be used in the conventional manner.

In FIGS. 3 and 4, I show a modified system whereby the recording grooves 118 are provided on the upper surface of the disc portion 113 but the flange 114 need not be removed. The spindle opening formed at 119' by the removal of pushout 119 is here extended by a plurality of angularly equispaced and axially symmetrical formations 123 which support the central portion of the disc 113 upon the turntable at substantially the same height as that at which the disc is supported by the flange 114. The formations 123 are dimensioned to form a sleeve adapted to hug the spindle and thus increase the frictional entrainment of the disc 113 with the turntable. To prevent bowing of the record surface, I have found it advantageous to provide radial ribs 124, which can be of triangular configuration as illustrated in FIG. 3 to form reinforcing webs between the formations 123 and the underside 117 of the disc 113. These ribs advantageously terminate at the flange 114 and may be oriented so as not to interfere with the setting of the cover upon the container.

In the system of FIG. 5, the flange 214 is provided with a bead 222 engageable by the cutting disc 250 and the toothed wheel 251 of an automatic or manual can opener which severs the flange 214 from the record-carrying disc 213. The cover can be held directly by the user for the severing operation or can be mounted upon the can for this purpose.

Other modifications of the invention described and illustrated above, such as the omission of the ribs 124, the use of projections along the undersurface of the cover remote from the central zone, the provision of other means for facilitating removal of the pushout and the flange, and the like will be readily apparent to those skilled in the art.

I claim:

1. A usable cover, formed unitarily integral from a synthetic resin material, for an open-mouth container comprising a disc portion having at least two generally planar surfaces including an upper and a lower surface, one of said surfaces being provided with a spiral sound-reproducing groove, a circumferential transverse flange unitary with said disc portion extending all around the periphery of said disc portion and forming an apron depending below said lower surface for engagement with said container, and means unitarily integral with both said flange and said disc for detaching said flange from said disc portion, bead extension of said flange, located at the junction of said disc and flange, and projecting upwardly from said upper surface of the disc portion and outwardly from the apron, both such projections of the circumferential bead being so arranged as to be engageable by the cutter disc and toothed wheel, respectively, of a can opener, thereby to detach said flange and disc portions of said reusable cover.